United States Patent
Takatsugi et al.

(10) Patent No.: US 7,431,583 B2
(45) Date of Patent: Oct. 7, 2008

(54) INJECTION MOLDING MACHINE

(75) Inventors: Satoshi Takatsugi, Yamanashi (JP);
Wataru Shiraishi, Yamanashi (JP);
Hiroyasu Asaoka, Yamanashi (JP);
Toshio Ishikuro, Yamanashi (JP);
Hiroshi Imamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/491,243

(22) Filed: Jul. 24, 2006

(65) Prior Publication Data

US 2007/0026096 A1    Feb. 1, 2007

(30) Foreign Application Priority Data

Jul. 29, 2005    (JP) .............................. 2005-221603

(51) Int. Cl.
*B29C 45/18*    (2006.01)
*B29C 45/47*    (2006.01)
*B29C 45/76*    (2006.01)

(52) U.S. Cl. ...................... 425/587; 425/147; 425/169; 366/76.2; 366/76.9

(58) Field of Classification Search ................ 425/147, 425/169, 207, 587; 366/76.2, 76.9
See application file for complete search history.

(56) References Cited

U.S. PATENT DOCUMENTS

| | | | |
|---|---|---|---|
| 3,036,335 A | | 5/1962 | Heston et al. |
| 3,913,796 A | * | 10/1975 | Aoki ........................... 222/238 |
| 5,261,740 A | * | 11/1993 | Mosher et al. ............. 366/76.9 |
| 5,282,548 A | * | 2/1994 | Ishihara ....................... 222/55 |
| 5,460,507 A | * | 10/1995 | Takatsugi ................... 425/550 |

| | | |
|---|---|---|
| 2002/0068104 A1 | 6/2002 | Asano |

FOREIGN PATENT DOCUMENTS

| | | |
|---|---|---|
| DE | 299 17 363 | 3/2000 |
| EP | 0 411 369 | 2/1991 |

(Continued)

OTHER PUBLICATIONS

Extended European Search Report, mailed Dec. 1, 2006, and issued in corresponding European Patent Application No. 06253818.6-1253.

(Continued)

*Primary Examiner*—Robert B. Davis
*Assistant Examiner*—Joseph Leyson
(74) *Attorney, Agent, or Firm*—Staas & Halsey LLP (57) ABSTRACT

The invention provides an injection molding capable of adjusting a detection level with a simple structure and detecting a deposit level of the resin pellets near a plasticizing screw. A cooling jacket is mounted so that a resin supplying hole of the cooling jacket communicates with a resin supplying hole of a heating cylinder. A sensor head mounted on a sensor mounting plate is inserted into the resin supplying hole through a sensor insertion port provided on a hopper plate and a resin inlet and detects the deposit level of the resin pellets deposited in the resin supplying hole. Changing the extent of insertion of the sensor head enables the resin pellets deposit detection level to be changed, and further, enables the deposit level near the outer periphery of the screw to be detected. Setting the sensor detection direction perpendicular to the resin deposit direction enables dirtying of the sensor detection surface by the resin pellets to be reduced, thus enabling erroneous detection readings to be reduced.

5 Claims, 8 Drawing Sheets

FOREIGN PATENT DOCUMENTS

| | | |
|---|---|---|
| JP | 61-77220 | 5/1986 |
| JP | 63-94706 | 6/1988 |
| JP | 1-64424 U | 4/1989 |
| JP | 3-121813 | 12/1991 |
| JP | 3012320 | 4/1995 |
| JP | 8-57901 | 3/1996 |
| JP | 9-225964 | 9/1997 |
| JP | 10-277721 | 10/1998 |
| JP | 10-329173 | 12/1998 |
| JP | 2000-846 | 1/2000 |
| JP | 2000-94110 | 4/2000 |
| JP | 2001-71363 | 3/2001 |
| JP | 2002-144386 | 5/2002 |
| JP | 2003-236885 | 8/2003 |
| JP | 2004-262122 | 9/2004 |
| JP | 2005-47052 | 2/2005 |
| JP | 2005-205788 | 8/2005 |
| WO | WO 99/33630 | 7/1999 |

OTHER PUBLICATIONS

Japanese Patent Office Notice of Reasons for Rejection, mailed Jul. 10, 2007 and issued in corresponding Japanese Patent Application No. 2005-221603.

* cited by examiner

INJECTION MOLDING MACHINE

BACKGROUND OF THE INVENTION

1. Field of the Invention

The present invention relates to an injection molding machine, and more particularly to an injection molding machine having a sensor for detecting an amount of resin in a resin supplying hole that supplies resin to a heating cylinder.

2. Description of the Related Art

An injection molding machine repeatedly executes the steps of rotating a plasticizing screw inside a heating cylinder to knead and melt resin supplied to the interior of the heating cylinder and further metering the resin, then stopping screw rotation, advancing the screw and injecting melted resin into a mold, compressing, cooling and then opening the mold to remove the molded article.

The resin pellets that are put into the heating cylinder are dried in a drier and put into a hopper by a resin feeder or the like, pass through a resin supplying hole mounted on the machine main unit or the heating cylinder, ground by a revolving screw and melted. As a result, as the length of time the resin pellets remain inside the hopper and the resin supplying hole increases, the temperature of the resin pellets drops and the pellets collect moisture, which can cause molding defects. Consequently, in order to reduce temperature drop and humidification, and further, to maintain a uniform resin pellet density when the resin pellets are ground by the screw, only the minimum necessary amount of resin pellets are put into the hopper, the amount of resin pellets inside the hopper is measured by a resin amount detection device, and the amount of resin supplied to the hopper is adjusted to control the amount of resin remaining in the resin supplying hole, that is, the remaining resin amount (the resin deposit level).

Normally, the resin amount detection device of the resin feed machine is mounted above a hopper mounting port provided either at the base of the heating cylinder or the machine main unit. However, with this method, it is possible to detect the resin pellets only when the topmost surface of the resin is on the upstream side of the machine main unit, and moreover, it is difficult to mount the detection device near the screw. Accordingly, as described below, a variety of resin detection methods have been proposed.

Thus, an arrangement is known in which a capacitance proximity switch capable of moving along the outside of a resin supply cylinder that supplies resin to the resin supplying hole of the heating cylinder is provided and the remaining resin amount at a resin inlet is measured (for example, JP 3-121813U). However, because this arrangement places the sensor on the outside of the resin supply cylinder, it is difficult to place the sensor near the screw, and thus it is difficult to measure the remaining resin amount.

An arrangement in which a transparent portion formed from glass or the like is provided on one part of the resin supply cylinder that supplies resin to the resin supplying hole and a sensor at the position of the transparent portion measures the resin level inside the resin supply cylinder has also been proposed (for example, JP 63-94706U and JP 2003-236885A). However, with this method, to detect the resin level with the sensor it is necessary to make a portion of the resin supply cylinder out of glass or the like, which raises the cost of production. Further, it is to be expected that a complicated structure is necessary to move the sensor close to the screw and that it is therefore difficult to measure the resin pellet deposit level near the screw.

In addition, a device that disposes a light-emitting element and a light-receiving element and detects the resin deposit level has also been proposed (for example, JP 61-77220U). In this device, the sensor detection position is fixed and the resin amount to be detected cannot be changed.

Further, a method has been proposed that detects the resin pellet deposit level of the resin supply part with a reflective-type level sensor or photo sensor from the top of the screw (JP 3012320U). The remaining resin pellets are not always still due to the action of the screw and sometimes the resin pellets rebound due to the action of the screw. As a result, with this method, since the sensor detection surface faces in the direction of the screw, resin pellets thrown up by the action of the screw frequently strike the sensor detection surface, dirtying and scuffing the sensor detection surface, with the risk of easy deterioration of the sensor detection capability. If the sensor is moved away from the screw in order to prevent the dirtying of the sensor by the resin pellets thrown up by the action of the screw, the sensor is also removed from the topmost surface of the remaining resin, necessitating a high-accuracy sensor in order to measure the resin amount or for slightly changing the resin pellets deposit level.

In addition, since the resin deposit level must be measured by measuring the distance from the sensor to the resin, erroneous detection readings can easily occur when the resin is agitated by the action of the screw, and it is predicted that a high-accuracy sensor is required to prevent such erroneous measurement readings.

SUMMARY OF THE INVENTION

The present invention provides an injection molding machine capable of adjusting a position of sensing a deposit level of the resin pellets remaining in the resin supplying hole with a simple structure, and further capable of sensing the deposit level of the resin pellets near a plasticizing screw.

An injection molding machine of the present invention comprises: a heating cylinder; a plasticizing screw arranged in the heating cylinder; a resin supplying hole for supplying resin fed from a resin inlet to the plasticizing screw in the heating cylinder; and a sensor having a sensor head inserted into the resin supplying hole from the resin inlet to have a predetermined position in the resin supplying hole for sensing a deposition level of the resin in the resin supplying hole, such that a sensing direction of the sensor head is orientated to an inner surface of the resin supplying hole and to the resin deposited in the resin supplying hole.

The sensing direction of the sensor head may be substantially perpendicular to a direction of deposition of the resin in the resin supplying hole.

The injection molding machine may further comprise a hopper for feeding the resin to the resin inlet, and a hopper plate mounting the hopper thereon and having an opening through which the sensor head is inserted into the resin supplying hole.

The injection molding machine may further comprise a sensor mounting member for mounting the sensor head or a cable connected to the sensor head such that the sensor head is fixed at the predetermined position in the resin supplying hole.

The injection molding machine may further comprise adjusting means for adjusting the predetermined position of the sensor head in the resin supplying hole.

The adjusting means may comprise a slide mechanism provided in the sensor mounting member.

The adjusting means may comprise a spacer or shim arranged between the hopper plate and the heating cylinder, the spacer or shim having a hole through which the sensor head is inserted into the resin supplying hole from the resin inlet.

The injection molding machine may further comprise a cooling jacket arranged around an outer circumference of the heating cylinder for cooling the heating cylinder, and the resin supplying hole may be provided by a through hole formed in the cooling jacket and the heating cylinder.

The injection molding machine may further comprise a spacer or shim arranged between the cooling jacket and the hopper plate so as to adjust the position of the sensor head in the resin supplying hole, the spacer or shim having a hole through which the sensor head is inserted into the resin supplying hole from the resin inlet.

With the injection molding machine as described above, there is no need to provide a separate sensor mounting mechanism on the heating cylinder or the machine main unit, and moreover, there is no need to use glass, an aperture or the like in a portion of the heating cylinder or the machine main unit in order to detect the resin. Further, there is no need for a complicated configuration requiring an expensive sensor, either, making it possible to use an inexpensive device structure. In addition, the sensor detection position can be easily adjusted to a position near the screw, enabling the deposited resin amount to be adjusted easily and moreover enabling injection to proceed using the minimum required amount of resin, enabling the deposited resin amount from the mouth of the hopper to the resin inlet to be decreased and the deposit time to be reduced. As a result, the absorption of moisture by and the decrease in temperature of the resin pellets can be reduced, virtually eliminating factors that lead to the occurrence of molding defects. Further, since the resin pellets do not strike the sensor detection surface with force, the sensor detection surface is not easily dirtied or scratched, thereby enabling any deterioration in detection performance or occurrence of sensor malfunction to be reduced.

DETAILED DESCRIPTION

Figure 1:
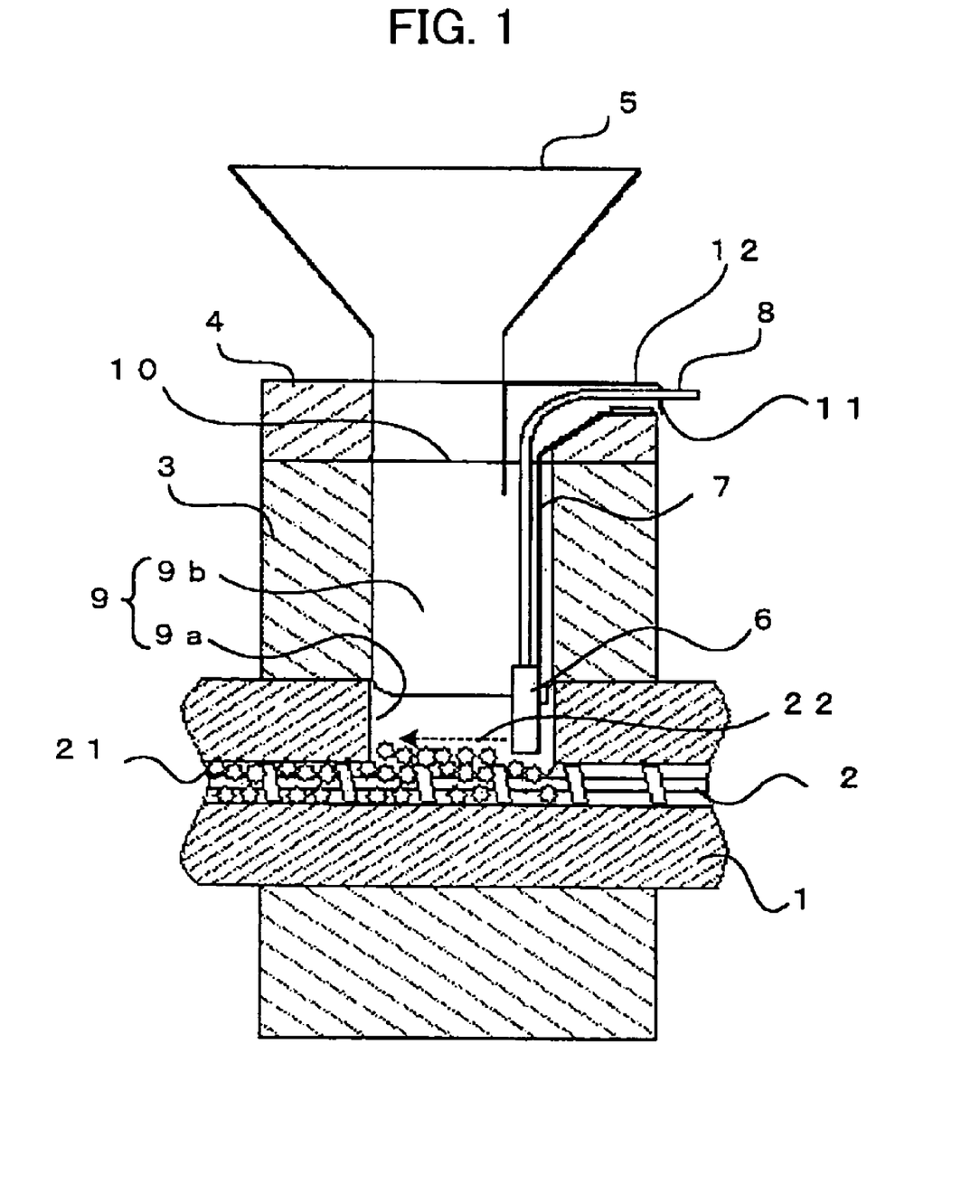
FIG. 1 is a sectional view of a resin supplying hole of an injection molding machine of a first embodiment of the present invention.
Figure 2:
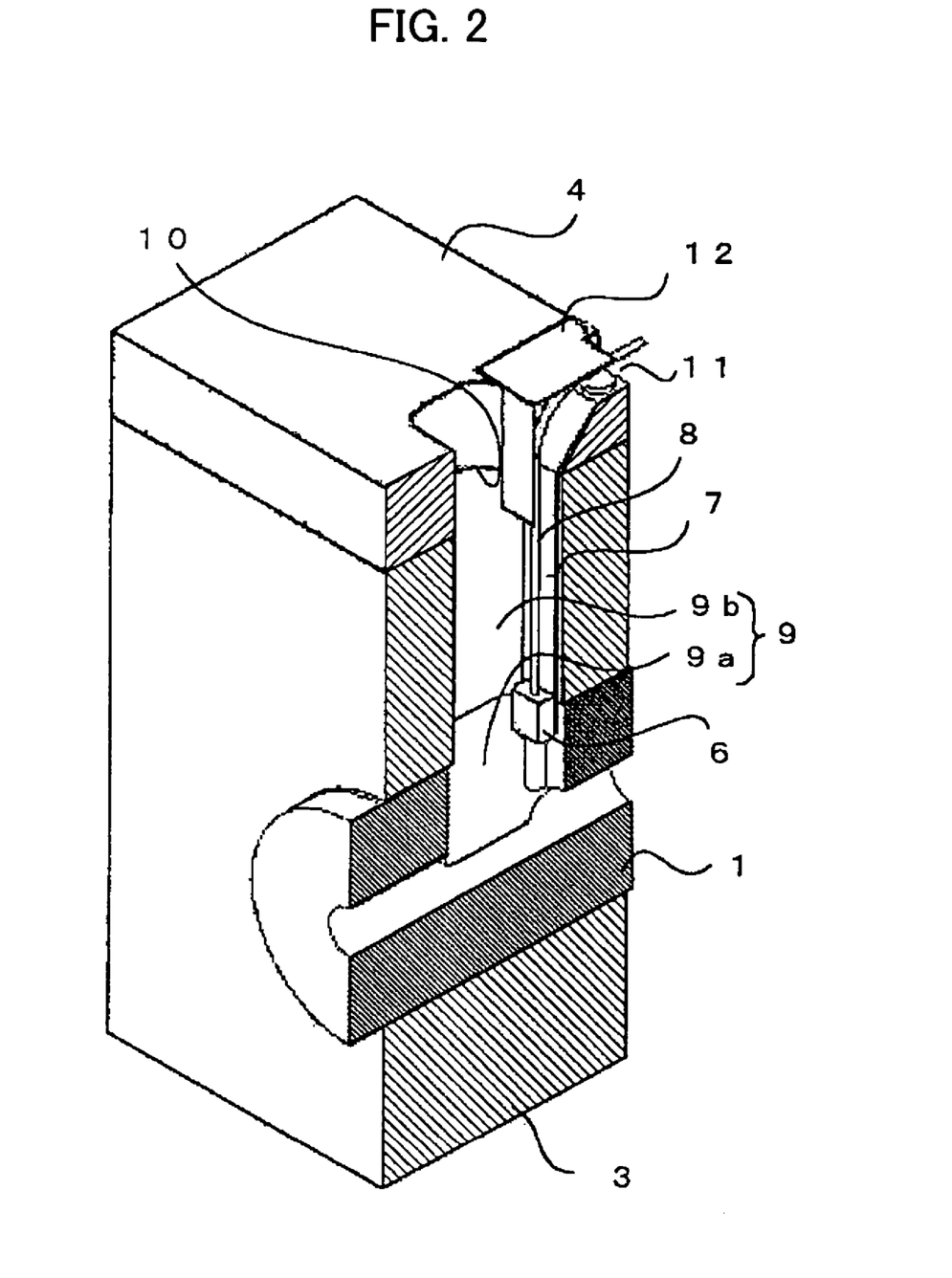
FIG. 2 is a sectional perspective view of the resin supplying hole of the first embodiment.

FIG. 1 is a sectional view of a resin supplying hole of an injection molding machine of a first embodiment of the present invention. FIG. 2 is a sectional perspective view of the resin supplying hole of the first embodiment.

A plasticizing screw 2 is inserted in a heating cylinder 1, a resin supplying hole 9a is provided on the heating cylinder 1 and a cooling jacket is provided on the outside of the heating cylinder 1. A resin supplying hole 9b provided on the cooling jacket 3 is disposed so as to communicate with the resin supplying hole 9a of the heating cylinder 1, and the heating cylinder 1 resin supplying hole 9a and the cooling jacket 3 resin supplying hole 9b are connected so as together to form a continuous resin supplying hole 9. In addition, a hopper plate 4 having a hopper 5 and that supplies resin pellets 21 supplied to the hopper 5 to a resin inlet 10 of the resin supplying hole 9 (specifically, the resin supplying hole 9b) is set and mounted on the cooling jacket 3. A sensor head 6 of a sensor that measures the deposit level of the resin pellets 21 is positioned inside the resin supplying hole 9 along one lateral side surface thereof. A sensor insertion port is provided on the hopper plate 4, and a sensor mounting plate 7 on which the sensor head 6 and a sensor cable 8 are fixedly mounted is inserted into the resin supplying hole 9 from the resin inlet 10 through a sensor insertion port 11 and the sensor mounting plate 7 is mounted on a fixed mounting part of the injection molding machine, such that, in this embodiment, through mounting on the hopper plate 4, the sensor head 6 is positioned and fixed at the resin supplying hole 9. The sensor cable 8 that is connected to the sensor head 6 extends outside the sensor insertion port 11. A cover 12 is provided to cover the sensor insertion port 11 provided on the hopper plate 4. The cover 12 prevents the resin pellets 21 from spilling out of the sensor insertion port 11, but need not necessarily be provided.

The structure is designed so that the sensor cable 8 passes through the sensor insertion port 11 provided on the hopper plate 4 and is extended in a direction that does not interfere with the hopper 5 mounted on top of the hopper plate 4. Such an arrangement enables the sensor to be mounted without the need to design the hopper 5 to accommodate the sensor as well.

Although in FIG. 1 a funnel-shaped hopper 5 is set on the hopper plate 4, it is not necessary that the hopper 5 be placed directly atop the hopper plate 4. Alternatively, for example, the hopper 5 may be placed on the hopper plate 4 through a separate member such as a shutter or a hopper mounting plate that is separate from the hopper plate 4.

In addition, the shape of the hopper 5 is not limited to the funnel shown in FIG. 1. The hopper 5 may be any shape, such as a hose or a pipe, provided that it can supply resin pellets 21 to the resin supplying hole 9 through the hopper plate 4.

The resin pellets 21 are supplied to the interior of the hopper 5 by a resin feeder such as a loader, not shown, and deposited in the resin supplying hole 9 (resin supplying holes 9a, 9b). The deposited resin pellets 21 are engaged by the screw 2 as the screw 2 rotates and moved to the front of the insertion hole of the screw 2 (to the left in FIG. 1). The deposit level of the deposited resin pellets 21 is detected by the sensor, and in order to prevent the resin pellets 21 from getting damp or cooling off, both of which make the resin pellets harder to melt, the supply of resin from the hot resin feeder is adjusted to reduce the amount of time the resin pellets 21 remain in the resin supplying hole 9.

To enable the deposit level of the resin pellets 21 to be detected, the sensor head 6 is oriented so that the detection surface and the direction of detection of the sensor faces in a direction that faces the deposited resin pellets 21, and further, that faces a wall surface of the resin supplying hole 9. In other words, since the sensor head 6 is positioned along the surface of one wall of the resin supplying hole 9 (the resin supplying holes 9a, 9b), preferably its detection direction faces the central longitudinal axis of the resin supplying hole 9 and the detection surface of the sensor faces the surface opposite the side on which the sensor head 6 is disposed (in FIG. 1, the direction indicated by arrow 22 shown by the broken line). However, the detection direction of the sensor need not necessarily face the central axis of the resin supplying hole 9, and may be any direction provided that the it faces a wall surface of the resin supplying hole 9 that enables the resin deposit level to be measured.

Figure 11:
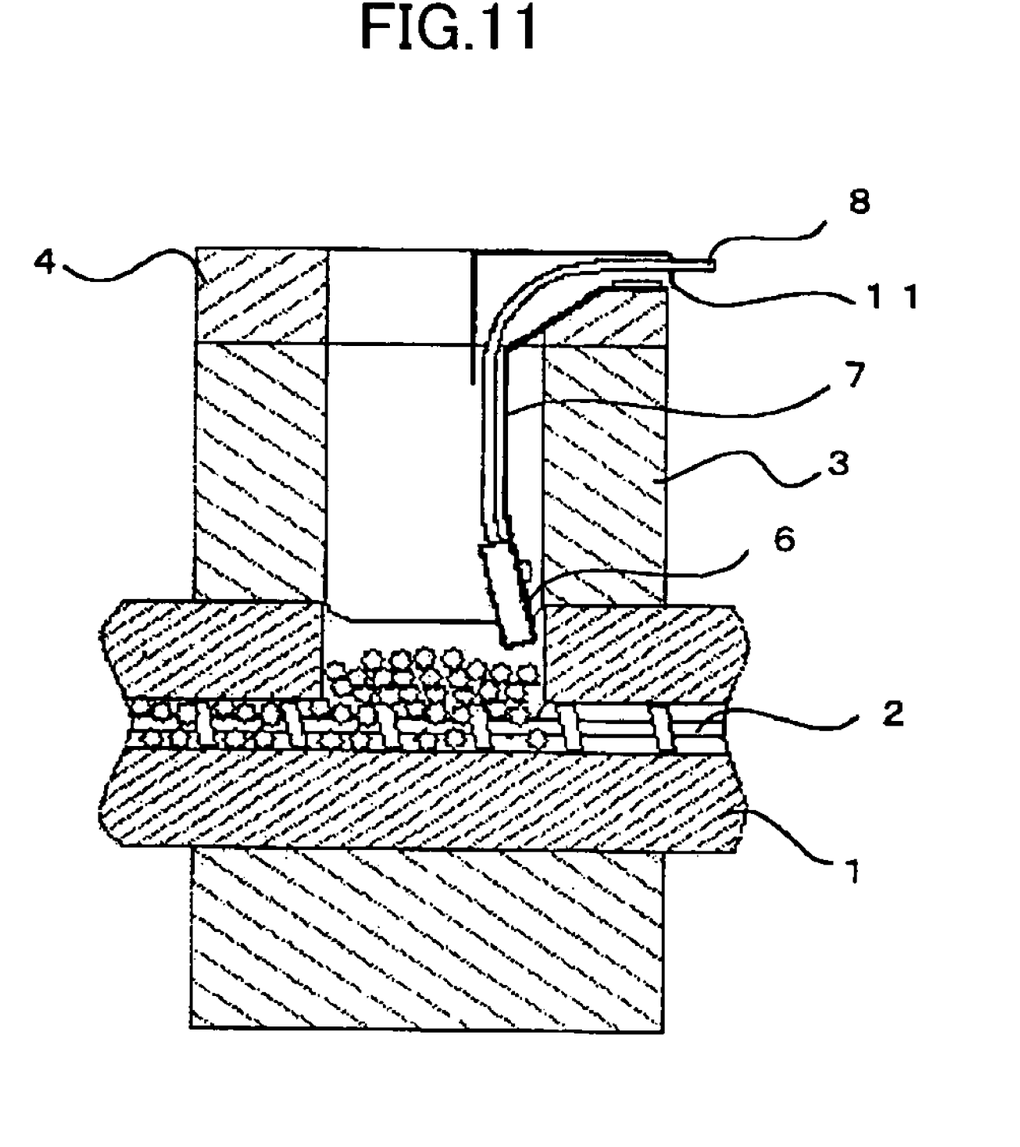
FIG. 11 illustrates another and different disposition and orientation of the sensor head of the injection molding machine of the first embodiment of the present invention embodiment.

Moreover, since the sensor detects the resin deposit level, it is preferable that the sensor head 6 be disposed so as to face in a direction that is the perpendicular to the direction of deposition of the resin and parallel to the resin deposit level surface. However, it is still possible to measure the resin deposit level even when the sensor head 6 is positioned so that the detection direction is at an angle to the direction of deposition, as shown in FIG. 11.

In addition, setting the sensor detection direction so as to face the wall of the resin supplying hole 9 prevents the sensor detection surface from getting dirty and makes it harder for erroneous measurements to occur.

The resin pellets 21 deposited inside the resin supplying hole 9 are not always at rest but are instead constantly agitated by the action of the screw 2 and move longitudinally with great force. However, by orienting the sensor detection direction toward the wall, that is, by facing the sensor detection surface toward the wall of the well, the resin pellets 21 when agitated by the screw 2 either do not strike the sensor detection surface or strike the sensor detect surface only weakly, which prevents the sensor detect surface from getting dirty, and further, prevents the detection surface from getting scratched, which in turn helps prevent erroneous measurements and enables the level of the resin pellets 21 to be reliably measured.

In addition, orienting the sensor detection direction toward the unmoving surface that is the wall of the resin supplying hole 9 calibrates the sensor reading when there are no resin pellets 21, and makes clear the threshold between readings when there are resin pellets 21 and when there are no resin pellets 21. Further, for the detection of the resin pellets 21 it is sufficient that the resin pellets 21 be detected somewhere along the surface of the wall of the resin supplying hole 9 from the detection surface of the sensor, thereby mitigating the effect of agitation of the resin pellets 21 by the action of the screw an enabling the resin pellets 21 to be reliably detected.

Figure 3:
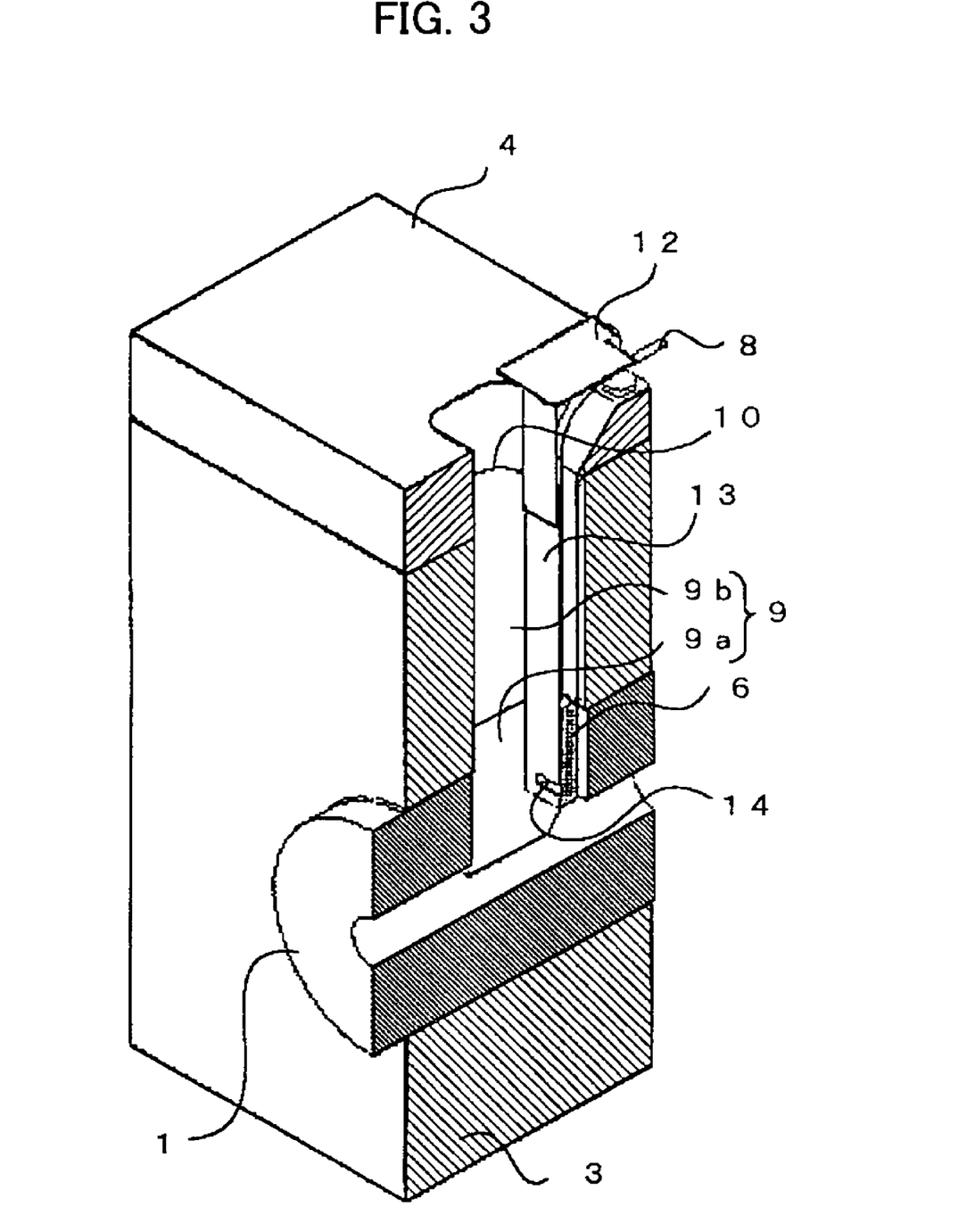
FIG. 3 is a sectional perspective view of a second embodiment of the present invention.

As a way of preventing the sensor detection surface from getting dirty, the sensor mounting plate 7 may be a hollow, tube-like sensor mounting member and a slit opened at the sensor head to detect the resin deposit level. FIG. 3 is a sectional perspective view of a second embodiment of the present invention, which uses this hollow sensor mounting member. At least the sensor head 6 portion of the sensor mounting member 13 is formed in the shape of a tube that contains the sensor head 6 and is fixedly mounted on the hopper plate 4. In the embodiment shown in FIG. 3, the portion that corresponds to resin supplying hole 9 is formed in the shape of a tube. Moreover, a slit 14 is provided in the sensor mounting member 13 and the sensor head 6 detects the deposition level of the resin pellets 21 through that slit 14. The remainder of the structure is the same as that of the first embodiment shown in FIGS. 1 and 2.

In this second embodiment of the present invention, the detection surface of the sensor head 6 is covered by the tube-shaped sensor mounting member 13 so that only the detection surface of the sensor head 6 at the slit 14 is exposed, making it difficult to dirty the sensor detection surface. This second embodiment is particularly effective when using resin pellets 21 that would otherwise easily sully the sensor detection surface.

It should be noted that the sensor detects the deposition level of the by detecting the presence of resin pellets 21 near the sensor head 6. Although the embodiments shown in FIGS. 1, 2 and 3 use a reflective-type photoelectric sensor, alternatively, a capacitance sensor, ultrasonic sensor or non-contact-type distance sensor may be used. Further, a transmission-type photoelectric sensor described later may be used as well.

Next, a description is given of the operation of the embodiments.

When the uppermost surface of the resin pellets 21 deposited in the resin supplying hole 9, that is, the deposit level, falls below the detection level of the sensor head (on the screw side thereof), the sensor becomes unable to detect the resin pellets 21, and therefore, based on the sensor signal, for example, a resin feeder, not shown, supplies a small amount of resin pellets 21, with resin pellets 21 continuing to be fed until the sensor head 6 detects the resin pellets 21. This arrangement enables the amount of resin deposited inside the resin supplying hole 9 to be adjusted to the height of the detection level of the sensor head 6. Moreover, it is sufficient that the sensor merely detect the presence of the resin pellets 21, and therefore no very sophisticated sensor is required.

Figure 4A:
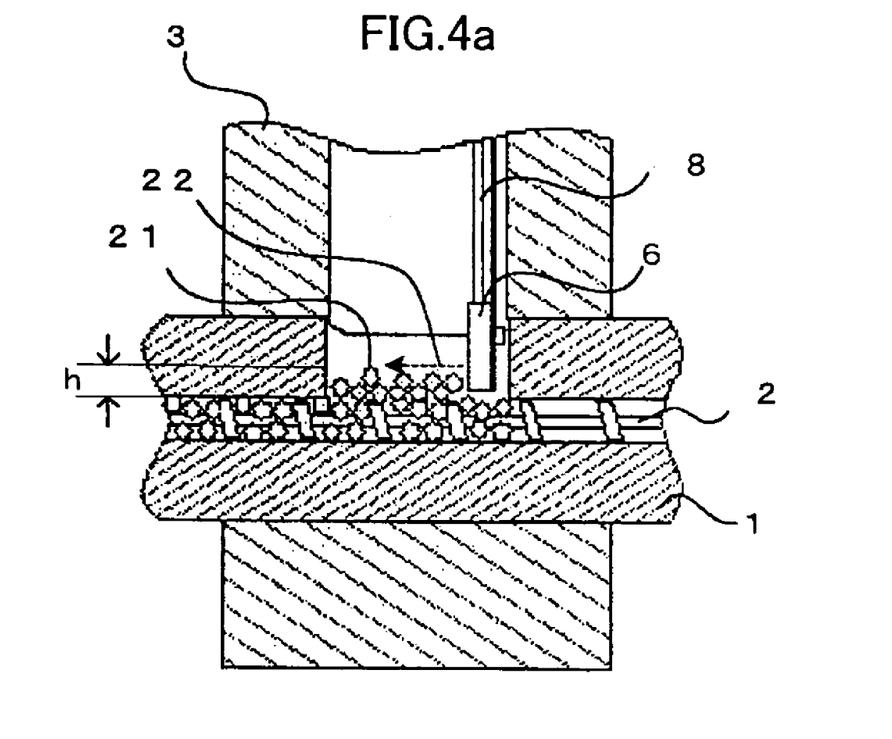
FIGS. 4a and 4b are diagrams illustrating a detection level adjustment method that measures a resin pellet deposit level in the first embodiment.
Figure 4B:
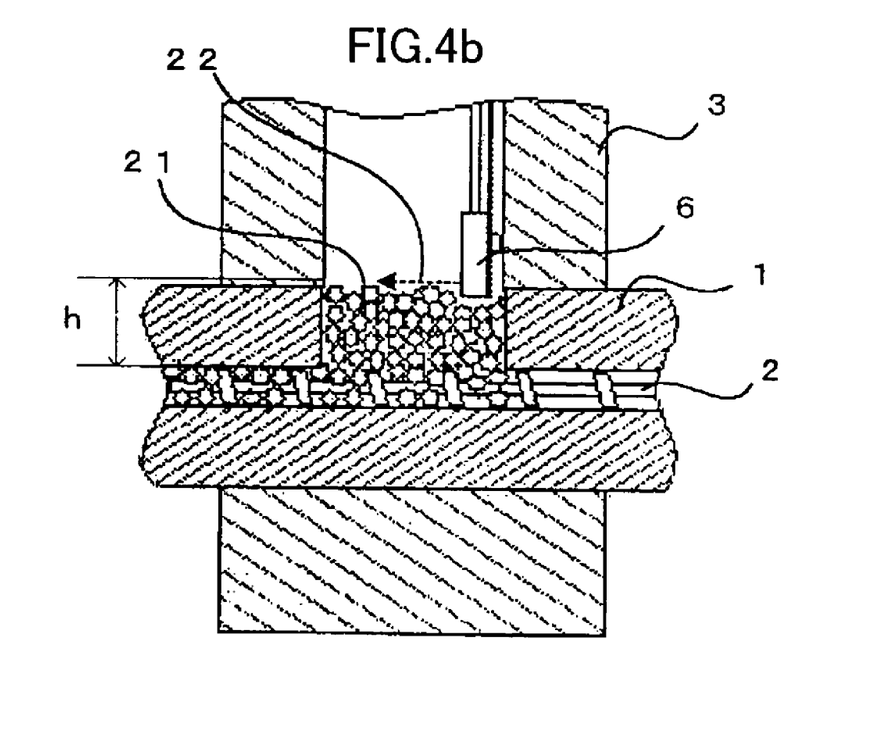

FIGS. 4a and 4b are diagrams illustrating a detection level adjustment method that measures a resin pellets deposit level. FIG. 4a shows an arrangement in which the sensor head 6 is disposed at a position near the outer periphery of the screw 2 and FIG. 4b shows the sensor head 6 disposed at a position farther from the outer periphery of screw 2 than in the arrangement shown in FIG. 4a. Since the sensor head 6 detects whether or not there are resin pellets 21 up to the detection level and detects the deposit level of the resin pellets 21, by adjusting a distance h from the outer periphery of the screw 2 to the level of detection by the sensor head 6, that is, the depth of insertion of the sensor head 6 in the resin supplying hole 9, the amount of resin allowed inside the resin supplying hole 9 of the injection molding machine can be adjusted to the required amount.

This required resin amount is a value that is determined by the volume and the mass of the molded article as well as by the molding conditions. Thus, for example, when changing the mold, adjusting the mounting position of the sensor head to a distance h that is calculated in advance based on the amount of resin needed as determined by the molded article and the capacity of the resin supplying hole of the injection molding machine accomplishes adjustment of the amount of resin in the resin supplying hole 9 and the resin inlet 10, thereby shortening the length of time the resin pellets 21 remain in the resin supplying hole 9 and the resin inlet 10 and preventing changes in humidity and temperature of the resin pellets 21.

Changing the position of the mounting of the sensor head 6 is accomplished by replacing the sensor mounting plate 7 or the sensor mounting member 13 with a desired mounting.

Figure 5:
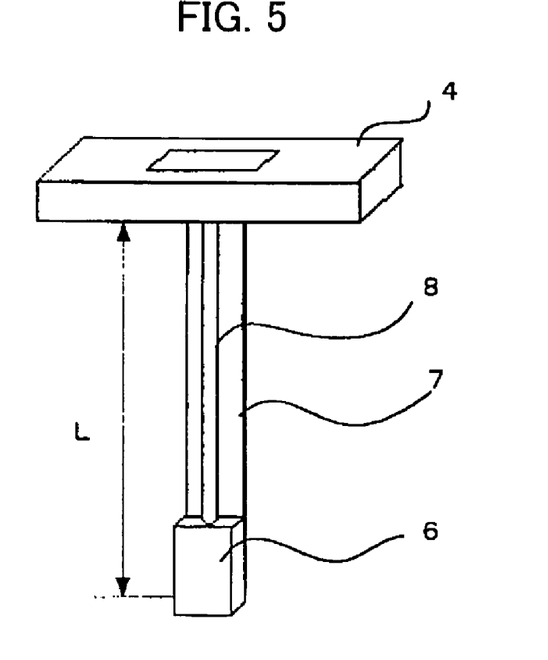
FIG. 5 is a diagram illustrating a sensor head mounting position and mounting adjustment.

If a distance from the bottom of the hopper plate 4 to the outer periphery of the screw 2 is D, then this distance is a known value determined by the injection molding machine, and therefore, if a distance from the bottom of the hopper plate 4 to the resin detection portion of the sensor is L as shown in FIG. 5, then, as described with reference to FIGS. 4a, 4b, the distance h from the outer periphery of the screw 2 to the detection level of the sensor can be derived from the equation h=D−L. Accordingly, attaching the sensor mounting plate 7 or the sensor mounting member 13 having a distance L corresponding to an adjustment-target distance h enables the mounting position of the sensor head 6 to be adjusted to the required resin amount.

Figure 6:
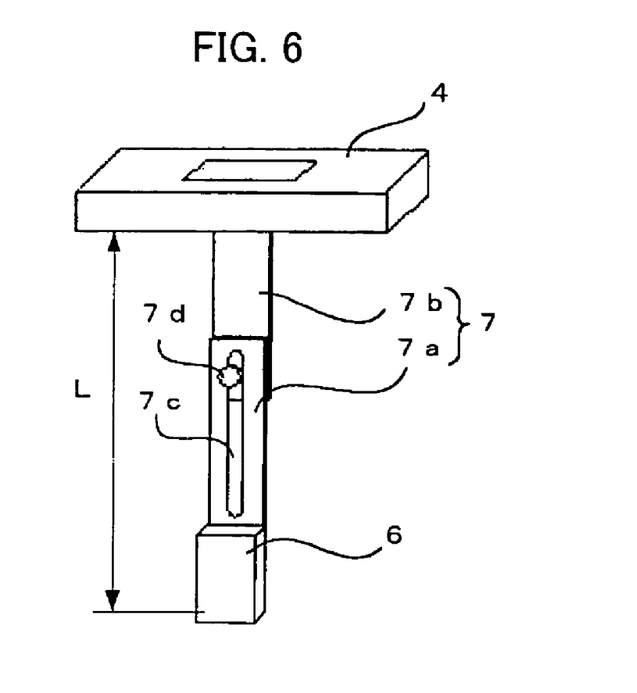
FIG. 6 is a diagram illustrating a detection level adjustment means using a sensor mounting member.

FIG. 6 is a diagram illustrating means for adjusting the detection level in place of replacing the sensor mounting plate 7 or the sensor mounting member 13. As shown in FIG. 6, the sensor mounting plate 7 is composed of two members 7a, 7b. A slot 7c is provided in the sensor mounting plate 7a on which the sensor head 6 is mounted, a bolt 7d that couples both sensor mounting plates 7a, 7b together is provided on the sensor mounting plate 7b, the sensor mounting plate 7a slides along the slot 7c, and the distance L of the sensor mounting plate 7 from the hopper plate 4 to the sensor head 6 can be varied by fixing the bolt 7d at a given length.

Figure 7:
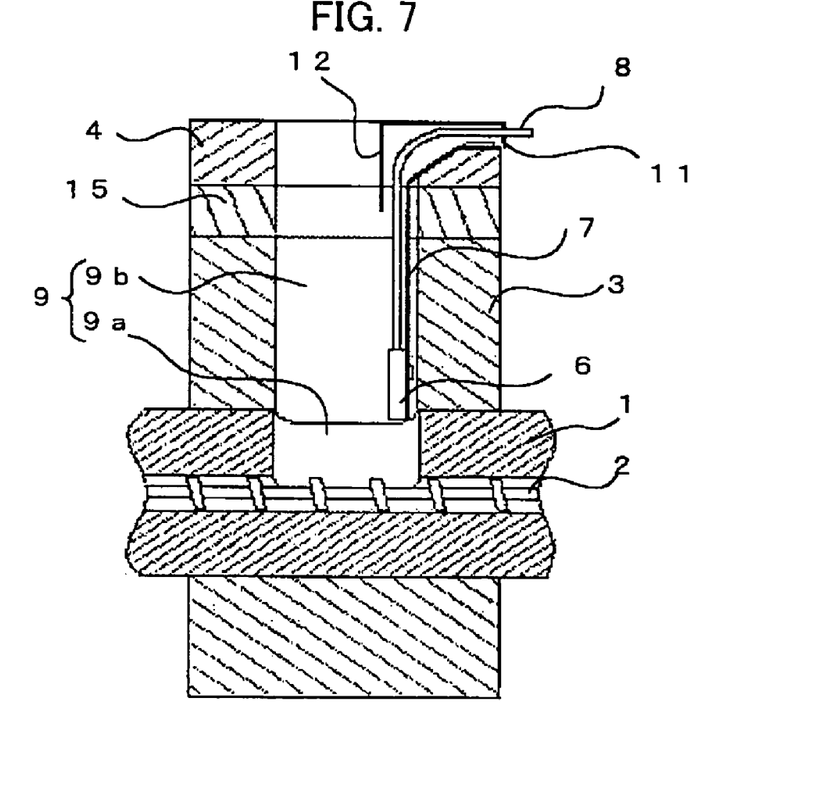
FIG. 7 is a diagram illustrating a method and a means using a spacer or a shim as an adjustment means for adjusting detection level by the sensor.

FIG. 7 is a diagram illustrating another method for a sensor detection level adjustment means. The adjustment method shown in FIG. 7 introduces between the hopper plate 4 and the cooling jacket 3a spacer or a shim 15 having an aperture that is substantially the same size as the resin supplying hole 9. The sensor head 6 is fixedly mounted on the sensor mounting plate 7 as shown in FIG. 5, fixing the distance from the mounting position of the sensor mounting plate 7 on the hopper plate 4 to the resin detection portion of the sensor head 6. A sensor mounting plate 7 that is designed so that this distance is set in advance in such a way that the sensor head 6 is positioned at the lower limit thereof, and the sensor head 6 is fixedly mounted on that sensor mounting plate 7. In addition, since the distance from the top of the cooling jacket 3 to the outer periphery of the screw 2 is known, by inserting the spacer or the shim 15 having a predetermined thickness between the cooling jacket 3 and the hopper plate 4 according to the desired detection level (that is, a predetermined distance h), the position of the sensor head 6 rises by the thickness of such spacer or shim 15 and the resin deposit detection level can be raised. As a result, by adjusting the position of the sensor head 6 by the thickness of the spacer or the shim 15, the distance h from the outer periphery of the screw 2 to the detection level of the sensor head 6 is adjusted to the required resin amount position.

In addition, with an injection molding machine configured so that the hopper plate 4 is mounted on top of the heating cylinder 1 with the hopper 5 placed on the hopper plate 4 and the resin pellets 21 supplied to the hopper 5 supplied to the resin supplying hole 9a of the heating cylinder 1 from the resin inlet 10, the deposit level of the resin pellets 21 can be similarly detected. In an injection molding machine of this construction, the sensor detection portion can be adjusted to the detection position of the resin deposit amount required by inserting between the heating cylinder 1 and the hopper plate 4 a spacer or a shim 15 provided with an aperture that is substantially the same size as the resin supplying hole 9a with which it communicates as shown in FIG. 8 as the sensor detection level adjustment means so as similarly to change the position of the sensor head 6.

Figure 8:
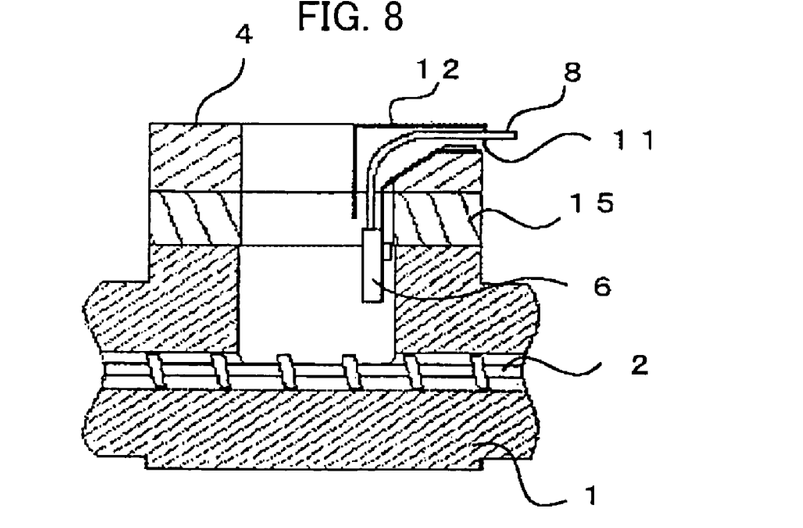
FIG. 8 is a diagram illustrating a sensor detection level adjustment means using a spacer or a shim in an injection molding machine not having a cooling jacket.
Figure 9:
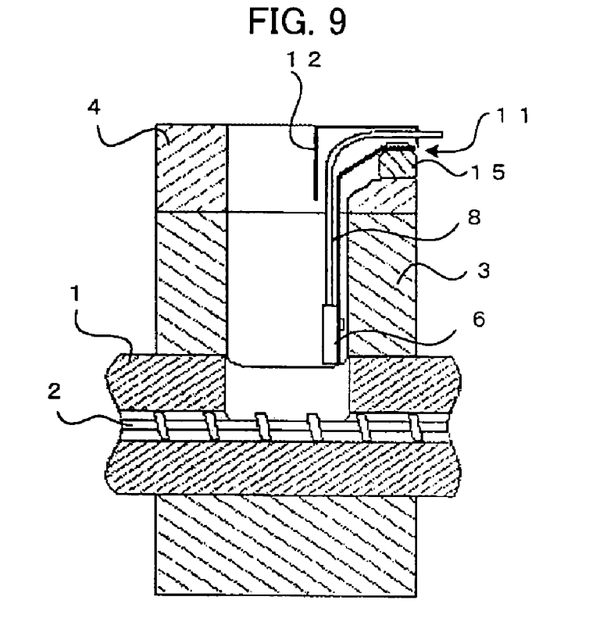
FIG. 9 is a diagram illustrating another adjustment means that adjusts the sensor detection level using a spacer or a shim.

In addition, the sensor head 6 can be adjusted to the required resin amount position by changing the position of the sensor head 6 by inserting the spacer or the shim 15 between the sensor mounting plate 7 and the hopper plate 4 as shown in FIG. 9 instead of between the cooling jacket 3 and the hopper plate 4 as shown in FIG. 7 or between the heating cylinder 1 and the hopper plate 4 as shown in FIG. 8.

Figure 10:
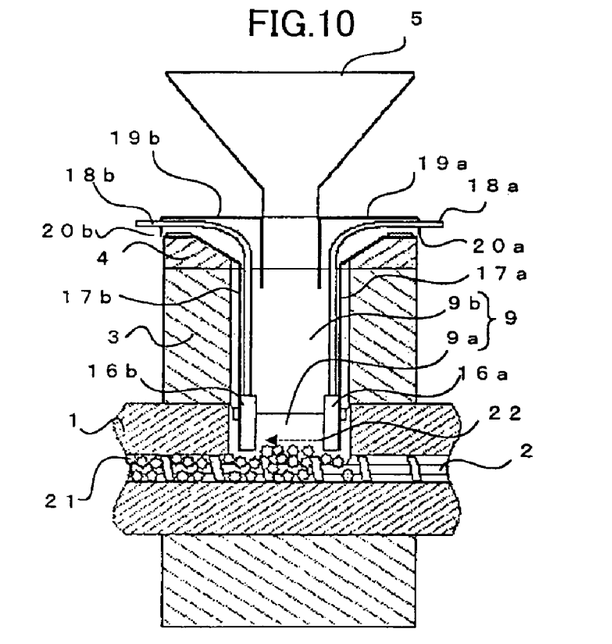
FIG. 10 is a sectional view of a resin supplying hole of an injection molding machine of a third embodiment of the present invention.

Although in the embodiments described above a reflective-type photoelectric sensor is used as the sensor, alternatively, a transmission-type photoelectric sensor having a light-emitting side and a light-receiving side like that shown in FIG. 10 may be used. FIG. 10 is a sectional view of a resin supplying hole portion of an injection molding machine of a third embodiment of the present invention using a transmission-type photoelectric sensor.

The point of difference between the third embodiment and the first embodiment as shown in FIGS. 1 and 2 is that in the first embodiment there is only one sensor head whereas in the third embodiment there are two sensor heads, a light-emitting side and a light-receiving side, necessitating two sensor mounting plates mounting the sensor heads as well as two sensor cables, two sensor insertion ports and two covers. The remainder of the structure of the third embodiment is identical to the first embodiment shown in FIGS. 1 and 2.

In other words, in this third embodiment, sensor insertion ports 20a, 20b are provided on the hopper plate 4 at positions disposed opposite each other on either side of the resin inlet 10. A sensor mounting plate 17a mounting a light-emitting side sensor head 16 is inserted into the resin supplying hole 9 from the sensor insertion ports 20a and the sensor mounting plate 17a is mounted on the hopper plate 4. A sensor cable 18a connected to the light-emitting side sensor head 16a is led to the outside from the sensor insertion port 20a.

Similarly, a sensor mounting board 17b mounting a light-receiving side sensor head 16b is inserted into the resin supplying hole 9 from the sensor insertion ports 20b and the sensor mounting plate 17b is mounted on the hopper plate 4. A sensor cable 18b connected to the light-receiving side sensor head 16b is led to the outside from the sensor insertion port 20b.

The light-emitting surface of the light-emitting side sensor head 16a and the light-receiving surface of the light-receiving side sensor head 16b are disposed opposite each other, and the presence of resin pellets 21 at the detection levels of the two heads 16a, 16b (the deposit level) is determined according to whether or not emitted light from the light-emitting side sensor head 16a is received at the light-receiving side sensor head 16b.

It should be noted that reference numerals 19a, 19b shown in FIG. 10 indicate covers that cover the sensor insertion ports 20a, 20b. In addition, an arrow 22 shown as a broken line indicates the direction of detection of the resin pellets 21 by the sensor.

In addition, as in FIG. 1, the hopper 5 may be set on the hopper plate 4 indirectly through a separate member such as a shutter or a plate introduced between the hopper 5 and the hopper plate 4, and moreover, the hopper 5 may be of any shape that allows the resin pellets 21 to be supplied to the resin supplying hole 9 through the hopper plate 4.

In the third embodiment as well, the adjustment of the detection level at which the sensor detects the resin deposit level may be accomplished either by providing a slot and a fixing bolt on the sensor mounting plate as shown in FIG. 6 and adjusting the position of the sensor heads 16a, 16b or by using a spacer or a shim as shown in FIGS. 7-9.

In addition, although in FIG. 10 the axial direction of the screw 2 and the resin pellet detection direction are parallel, it is not necessary that they be so, and thus, alternatively, if the detection direction faces the wall of the resin supplying hole of the injection molding machine, the angle of intersection of the screw axis and the resin pellet detection direction does not affect the functioning of the sensor.

Thus, as described above, in the present embodiments, the sensor head 6 is mounted on the sensor mounting plate 7 or the sensor mounting member 13 and inserted along the resin supplying hole 9 through the resin inlet 10 and positioned within the resin supplying hole 9. Therefore, the sensor can be mounted without opening a hole or using a glass tube in the cooling jacket 3 or the heating cylinder 1 in order to enable the sensor to detect the resin pellets 21, enabling the sensor resin pellet detection level to be moved nearer the screw with ease unhindered by thee structure of the injection molding machine or the strength of its components so as to provide more accurate resin pellet level measurement.

What is claimed is:

1. An injection molding machine, comprising:
    a heating cylinder;
    a plasticizing screw arranged in said heating cylinder;
    a resin supplying hole for supplying resin fed from a resin inlet to said plasticizing screw in said heating cylinder;
    a sensor having a sensor head inserted into said resin supplying hole from the resin inlet to have a predetermined position in the resin supplying hole for sensing a deposition level of the resin in the resin supplying hole, such that a sensing direction of the sensor head is orientated to an inner surface of the resin supplying hole and to the resin deposited in the resin supplying hole;
    a sensor mounting member for mounting the sensor head or a cable connected to the sensor head such that the sensor head is fixed at the predetermined position in the resin supplying hole; and
    adjusting means for adjusting the predetermined position of the sensor head in the resin supplying hole, wherein said adjusting means comprises a slide mechanism provided in said sensor mounting member.

2. An injection molding machine according to claim 1, wherein the sensing direction of the sensor head is substantially perpendicular to a direction of deposition of the resin in the resin supplying hole.

3. An injection molding machine according to claim 1, further comprising a hopper for feeding the resin to the resin inlet, and a hopper plate mounting said hopper thereon and having an opening through which the sensor head is inserted into said resin supplying hole.

4. An injection molding machine according to claim 1, further comprising a cooling jacket arranged around an outer circumference of said heating cylinder for cooling said heating cylinder, wherein said resin supplying hole is provided by a through hole formed in said cooling jacket and said heating cylinder.

5. An injection molding machine comprising:
    a heating cylinder;
    a plasticizing screw arranged in said heating cylinder;
    a resin supplying hole for supplying resin fed from a resin inlet to said plasticizing screw in said heating cylinder;
    a sensor having a sensor head inserted into said resin supplying hole from the resin inlet to have a predetermined position in the resin supplying hole for sensing a deposition level of the resin in the resin supplying hole, such that a sensing direction of the sensor head is orientated to an inner surface of the resin supplying hole and to the resin deposited in the resin supplying hole;
    a sensor mounting member for mounting the sensor head or a cable connected to the sensor head such that the sensor head is fixed at the predetermined position in the resin supplying hole;
    adjusting means for adjusting the predetermined position of the sensor head in the resin supplying hole; and
    a hopper for feeding the resin to the resin inlet and a hopper plate mounting said hopper thereon and having an opening through which the sensor head is inserted into said resin supplying hole,
    wherein said adjusting means comprises a spacer or shim arranged between said hopper plate and said sensor mounting member, and a slide mechanism provided in said sensor mounting member.

* * * * *

UNITED STATES PATENT AND TRADEMARK OFFICE
CERTIFICATE OF CORRECTION

| | | |
|---|---|---|
| PATENT NO. | : 7,431,583 B2 | Page 1 of 1 |
| APPLICATION NO. | : 11/491243 | |
| DATED | : October 7, 2008 | |
| INVENTOR(S) | : Satoshi Takatsugi et al. | |

It is certified that error appears in the above-identified patent and that said Letters Patent is hereby corrected as shown below:

Column 5, Line 18, after "that" delete "the".

Signed and Sealed this

Twenty-seventh Day of January, 2009

JOHN DOLL
*Acting Director of the United States Patent and Trademark Office*